United States Patent Office 3,006,840
Patented Oct. 31, 1961

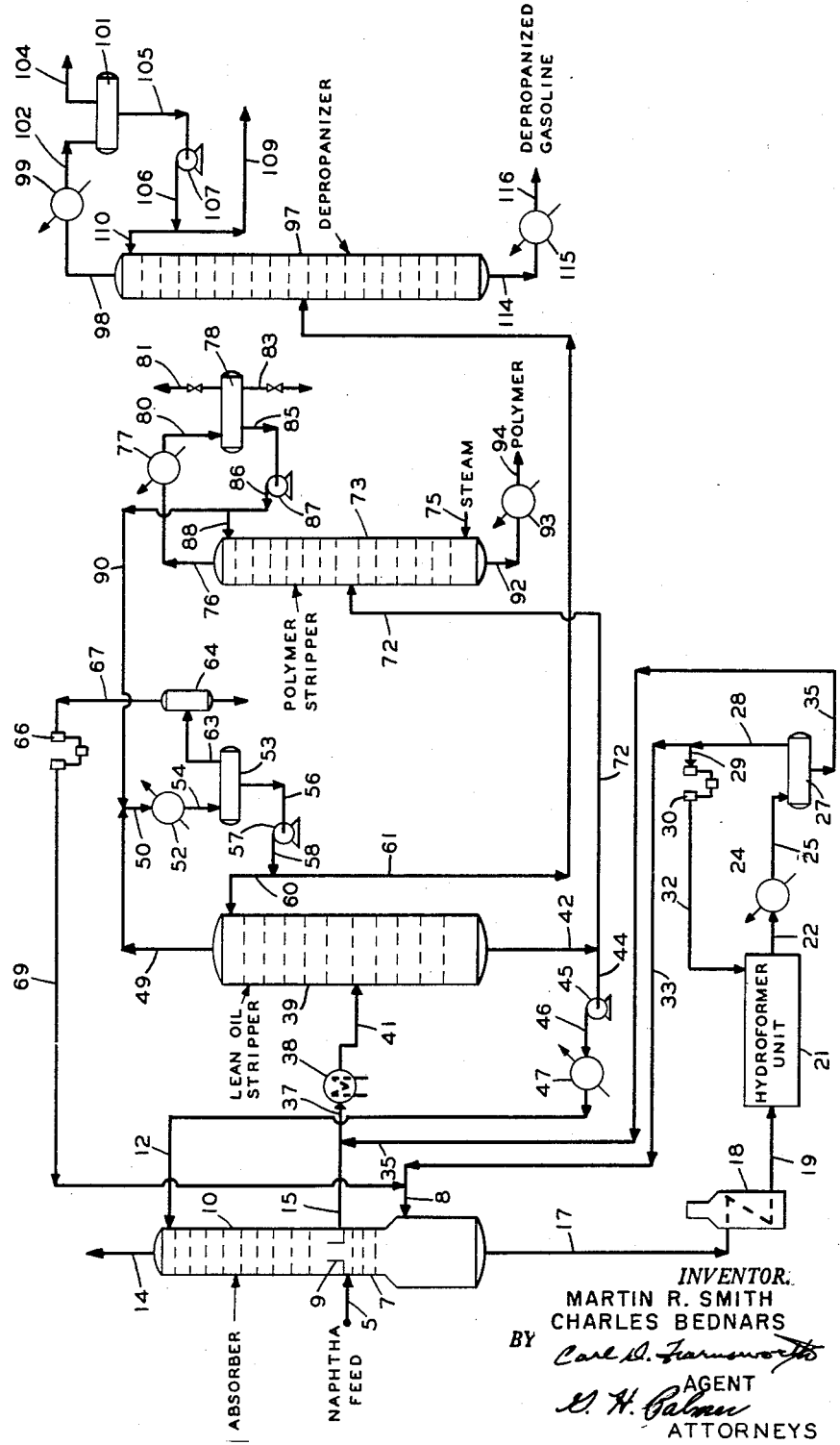

3,006,840
GENERAL REFORMING PROCESS
Martin R. Smith, Glen Ridge, N.J., and Charles Bednars, Port Washington, N.Y., assignors to The M. W. Kellogg Company, Jersey City, N.J., a corporation of Delaware
Filed Jan. 19, 1959, Ser. No. 787,436
5 Claims. (Cl. 208—82)

This invention relates to an improved hydroforming process and, more particularly, it pertains to a hydroforming process in which the product materials are recovered in an economical manner with a minimum loss thereof.

This is a continuation-in-part of application Serial No. 453,887, filed September 2, 1954, now U.S. Patent No. 2,929,773.

It is an object of this invention to provide an improved hydroforming process.

Another object of this invention is to provide a hydroforming process in which valuable gasoline components are recovered in an economical and efficient manner.

Other objects and advantages of this invention will become apparent from the following description and explanation thereof.

By means of this invention, it is contemplated effecting improvements in a hydroforming process where a light hydrocarbon oil is contacted with a hydroforming catalyst under suitable reforming conditions to produce a reformed product containing gasoline, polymer and normally gaseous product by the method which comprises contacting polymer with normally gaseous product containing gasoline components in an absorption zone thus enriching the polymer with said gasoline components, separating the normally gaseous product containing gasoline components from the aforesaid reformed gaseous product, passing separated normally gaseous product to the absorption zone, combining the enriched polymer with the remaining reaction product, passing the resultant mixture to a separating zone whereby polymer is separated therefrom, and passing a portion of the separated polymer to the absorption zone.

In another embodiment, the invention is directed to an improved sequence of steps for separating polymer product from reformed gasoline product under selected conditions where decomposition of the polymer product is substantially eliminated. That is, by applicants' improved sequence of separation steps, contamination and clogging of the separation or fractionating tower reboilers and other associated equipment with polymer decomposition products is virtually eliminated, thereby extending the life of equipment, avoiding costly maintenance including shut down and replacement of the equipment. Accordingly, by practicing the process in accordance with this invention, a greatly extended period of operation over that possible in prior art processes is possible and now provided for the reformer. This, of course, is of extreme importance to the refiner today in view of the high operating costs being experienced at this time.

The system for recovering product materials is applicable to a hydroforming process wherein a light hydrocarbon oil is contacted with a reforming catalyst, the light hydrocarbon oil can be gasoline, naphtha or kerosene, and these materials either singly or in mixtures thereof can be derived from a straight run operation or a cracking operation. A light hydrocarbon oil has an initial boiling point of about 75° to about 340° F. and an end point of about 360° to about 475° F. On the other hand, a naphtha fraction usually has an initial boiling point of about 90° F. to about 220° F., and an end point of about 320° F. to about 450° F. The paraffinicity of the feed material is measured by the Watson characterization factor and in the present invention, it can vary from about 11.5 to about 12.2. The olefinic concentration by virtue that the feed material can be a straight run stock or cracked stock or mixtures of the two, may vary from about 0 to about 30 mole percent and, likewise, the octane number can be at least 20 CFRR clear and up to about 75 CFRR clear. The sulfur concentration of the feed material can vary from about 0 to about 2.5% by weight, more usually, about 0.01 to about 1% by weight. In the case of sulfur sensitive catalysts, such as, for example, a platinum catalyst, it is desirable to use a feed material containing not more than about 0.03% by weight of sulfur and, preferably, not more than about 0.01% by weight of sulfur. The presence of sulfur tends to deactivate the catalyst at a faster rate than is economical or desirable. Accordingly, it is also contemplated in this invention to subject the feed material to a desulfurization treatment and this desulfurization treatment can take place after the feed material has been used as an absorbing medium, before it is fractionated for the removal of heavy ends or following such separation treatment.

The catalytic material to be used in the hydroforming operation is one which has hydrogenation-dehydrogenation properties or it is capable of aromatizing hydrocarbon materials. In this regard, the reforming catalyst can be selected from a variety of materials such as, for example, the noble metals, e.g., platinum, paladium, etc.; the oxides and/or sulfides of metals of groups IV, V and VI of the periodic table, e.g., molybdenum trioxide, chromia, tungsten oxide, vanadium sulfide, etc.; the heteropoly acids in which the outer acid forming element is chromium, molybdenum, vanadium or tungsten and the central acid forming element is, for example, phosphorus, silicon, aluminum, platinum, germanium, etc., and specific examples of the heteropoly acids are, silicotungstic acid, phosphomolybdic acid, aluminomolybdic acid, etc. The catalytic elements enumerated above can be used alone or supported on a carrier material such as, for example, alumina, silica, alumina-magnesia, activated charcoal, pumice, keiselguhr, zinc aluminate, etc. The catalytic element constitutes about 0.01 to about 50% by weight of the total catalyst. However, in the case of a noble metal, e.g., platinum, it more usually constitutes about .05 to about 15% by weight. Specific examples of catalytic materials are platinum-alumina, palladium-alumina, molybdenum trioxide-alumina, alkalized chromia-alumina, cobalt molybdate-alumina, tungsten sulfide-alumina, etc.

The light hydrocarbon oil is contacted with the catalytic material under reaction conditions which are selected on the basis of providing a net production of hydrogen. The reaction temperature is about 750° to about 1075° F., more usually, about 850° to about 975° F. The total pressure is about 25 to about 1000 p.s.i.g., more usually, about 50 to about 750 p.s.i.g. The amount of oil charged to the reaction zone relative to the catalyst which is present therein is measured as the weight space velocity, i.e., the pounds of oil charged to the reaction zone per hour per pound of catalyst present therein. The weight space velocity can be from about 0.05 to 20, more usually, about 0.1 to about 10. The reaction is effected in the presence of added hydrogen and the hydrogen rate is about 500 to about 15,000, more usually, about 1000 to about 7500, standard cubic feet, measured at 60° F. and 760 mm. Hg, per barrel of oil feed, abbreviated as SCFB. By virtue of the net production of hydrogen, the normally gaseous material containing about 50 to about 98% by volume of hydrogen is recycled to the hydroforming zone.

The reaction product which is produced from a hydroforming operation includes three main product materials, namely, normally gaseous product, gasoline and polymer.

The normally gaseous product is usually separated under essentially reaction pressure, consequently, it contains valuable gasoline components which, for the purpose of this specification and the appended claims, are to be understood as hydrocarbons containing at least four carbon atoms. In addition to the gasoline components, the normally gaseous product comprises hydrogen, methane, ethane, propane, propylene, etc. The gasoline material is the normally liquid product which has an end point varying in accordance with the needs of the time, generally, the gasoline product has an end point which may vary from about 375° to about 425° or even as high as 435° F. At present, the gasoline usually has an end point of about 400° to about 425° F. The remaining liquid product which boils above the gasoline product is termed as polymer. The initial boiling point of the polymer will vary in accordance with the end point of the gasoline material. The end point of the polymer can vary from about 500° to about 700° F. By virtue of the separation of the normally gaseous product from the normally liquid product under essentially reaction pressure, it is found that at equilibrium pertaining to the conditions existing in the separation zone, there is an appreciable amount of gasoline components which are present in the normally gaseous product. Consequently, provision is made to recover as much of the gasoline components as is economically feasible. In this invention the polymer material is used either alone or in combination with a light hydrocarbon material, e.g., the naphtha feed for the recovery of the gasoline components. Another important advantage in using the feed material as absorbent lies in the fact that the gaseous product serves to strip dissolved oxygen and water from the feed. Water tends to deactivate platinum catalyst whereas oxygen can cause preheater fouling due to promoting polymer formation. The enriched polymer is then combined with the normally liquid product and passed to a separation zone wherein the conditions are favorable for the removal of gasoline components from the polymer and inclusion in the gasoline material. The gaseous product from this operation is further treated, if desired, by absorption for the recovery of gasoline components, e.g., by the polymer product. The polymer fraction normally contains a large quantity of aromatics, hence, its absorptive properties can be improved by including therewith part of the gasoline product. In this connection about 2 to about 15 parts of gasoline product per part of polymer product, by volume, can be used in general. By increasing the absorptive properties of the polymer material, less absorbent is needed for the absorption of gasoline components from the normally gaseous product.

As hereinbefore discussed, one of the important aspects of this invention resides in the improved sequence of separation steps for the hydroformed liquid product to substantially eliminate decomposition of polymer product contained therein. In accordance with this invention, the total effluent from the hydroforming reaction zone is passed to a first high pressure separator wherein a gaseous fraction is separated from a liquid fraction. The liquid product recovered from the first high pressure separator which may be substantially equal to the pressure employed in the hydroforming step is combined with the rich oil from the second absorber hereinbefore discussed. The combined streams are preheated to an elevated temperature below the decomposition temperature of the entrained polymer and the thus heated liquid stream is then introduced into the intermediate portion of the lean oil stripper tower. In the lean oil stripper tower, essentially all of the entrained gaseous material and a major portion of the naphtha product from the first high pressure separator are stripped out with heat provided to the lower portion of the tower by a suitable reboiler. The lean oil stripper tower is maintained at a lower pressure than the pressure employed in the first high pressure separator and at a reduced pressure of about 40 to about 60 p.s.i.g., preferably about 50 p.s.i.g., or sufficiently elevated in order to maintain the bottom temperature of the tower relatively low for good stripping and fractionation without decomposing the polymer product concentrated therein. Generally the temperature in the bottom of the tower may be from about 400° F. to about 550° F., but preferably will be about 480° F., and may be as high as about 500° F. The lean oil tower conditions are selected to produce a stripped lean oil or naphtha product having a relatively high initial boiling point of about 300° F., ASTM in order to keep to a minimum the lean oil loss from the absorber. The lean oil stripper overhead is combined with the overhead vapors from the polymer stripper herein described with the combined stream cooled to condense substantially all of the naphtha product stream and the thus cooled and condensed combined stream is then passed to an additional separation zone or reflux drum maintained at a pressure of from about 10 to about 20 pounds below the pressure of the lean oil stripper and a temperature of about 100° F. A portion of the condensed liquid product recovered from the reflux drum separator is passed to the lean oil stripper as reflux with the remaining portion of the condensed liquid passed to a depropanizer tower for recovery of depropanized gasoline product.

The lean oil stripper tower bottoms having the polymer product concentrated therein and containing from about 2 to about 15 parts of naphtha or gasoline product per part of polymer product is withdrawn from the bottom of the tower at an elevated temperature below about 500° F. The major portion of this polymer containing stream is cooled and passed to the absorber tower as more fully described herein. The remaining portion or minor portion of this stream is passed to the polymer stripping tower. Final stripping of the hydroforming naphtha from the polymer product is accomplished in the polymer stripper without decomposition of the polymer product. This is accomplished by maintaining the polymer stripper at a slightly elevated pressure of about 5 to about 15 p.s.i.g., and preferably about 8 p.s.i.g. and a temperature below about 460° F. In addition, steam is introduced to the bottom of the polymer stripper or into a reboiler associated with the bottom of the polymer stripper to not only aid stripping, but more important to reduce the partial pressure of the polymer concentrated therein, whereby its bubble point is maintained at about 455° F. Accordingly, by applicants' novel combination and sequence of treating steps, the polymer product in the hydroformed gasoline product is efficiently separated therefrom without decomposition of the polymer, thereby contaminating the equipment employed in the process. While slightly higher or lower temperatures may be employed in the polymer stripper, it is essential that the decomposition temperature of the polymer be avoided at the conditions employed therein.

In order to provide a fuller understanding of the present invention, reference will be had to the accompanying drawing which provides a specific illustration thereof.

In the drawing, fresh naphtha feed having an API gravity of about 58.2° is supplied by means of line 5 at the rate of about 9000 barrels per day. The fresh feed is supplied to the lower absorption section 7 of the absorber wherein the material flows downwardly in countercurrent contact with upflowing normally gaseous product which is fed to the bottom of section 7 by means of line 8. The normally gaseous material passes upwardly through the opening of a donut tray 9 which serves to divide absorption section 7 from the upper absorption section 10. The fresh naphtha feed is charged to section 7 at a temperature of about 100° F. and the pressure in section 7 is maintained at about 230 p.s.i.g. A lean "polymer" product is fed to the top of absorption section 10 by means of line 12 at a temperature of about 100° F. This "polymer," which has an API gravity of about 29.7° by virtue of the fact that its initial boiling point is about 300° F. and contains about 8 parts of gasoline and 1 part of polymer, by volume, is fed to the absorption section 10 at the rate of about 5715 barrels per day. Gaseous material substantially reduced of gasoline components is discharged from the top of the absorber via line 14. The "polymer" descends downwardly through section 10 and thereby absorbs gasoline components from the upflowing gaseous material. In addition to recovering gasoline components which were originally present in the gaseous feed, this polymer also serves to recover any naphtha which has been vaporized and is present in the upflowing gaseous material. The enriched polymer is discharged from donut tray 9 by means of line 15.

The enriched naphtha feed is discharged from the bottom of section 7 by means of line 17 and it is charged to furnace 18 whereby its temperature is raised to about 950° F. The vaporized naphtha is discharged from furnace 18 by means of line 19 and it is charged to a hydroformer unit shown schematically as 21. The naphtha feed is contacted with a platinum catalyst containing about 0.6% by weight of platinum supported on alumina at an average temperature of about 920° F., a weight space velocity of about 1.0, a total pressure of about 330 p.s.i.g., and a hydrogen rate of about 5000 s.c.f.b. The reaction product is discharged from the hydroformer unit 21 by means of line 22 and it is cooled to a temperature of about 100° F. by means of condenser 24. The cooled reaction product is discharged from the cooler 24 by means of line 25, and thereafter, it is passed to a separating drum 27. In the separating drum, the reaction product is at a temperature of about 100° F. and a pressure of about 235 p.s.i.g. The normally gaseous product is discharged from the top of drum 27 by means of line 28 and a portion thereof, namely about 4000 s.c.f.b., is recycled to the hydroformer unit by passing through line 29, compressor 30 and line 32. Compressor 30 serves to raise the pressure of the recycle gas in order to maintain the flow and the pressure condition within the hydroforming unit. The net production of normally gaseous product flows from line 28 to line 33 and thence, it enters the bottom of absorber section 7 by means of line 8. The normally gaseous product having a molecular weight of about 8.74 is yielded at a rate of about 10,017 pounds per hour. The normally liquid product having an API gravity of about 52.6° is discharged from the bottom of separating drum 27 by means of line 35 at the rate of about 7802 barrels per day.

The enriched polymer flowing through line 15 from the absorber and the normally liquid product flowing through line 35 from drum 27 are combined and flow through line 37. The combined stream is raised to a temperature of about 400° F., by means of heater 38, and thence, it flows to a lean oil stripper 39 by means of line 41. In the lean oil stripper, the top temperature is maintained at about 365° F. and the bottom temperature is maintained at about 480° F., at a pressure of about 50 p.s.i.g. The lean oil stripper is a suitable fractionation tower in which the temperature is substantially greater than the temperature in the absorption column and the pressure is substantially reduced in order that lighter boiling gasoline components and lighter material can be readily stripped from the "polymer" and adequate fractionation can be effected to produce a gasoline product substantially free of polymer material. "Polymer" having an API gravity of 29.7° is discharged from the bottom of the lean oil stripper by means of line 42 at the rate of about 6000 barrels per day. The recycle stream to the absorber comprising about 5715 barrels per day passes through line 44. The recycle "polymer" stream is transported by means of pump 45 and thence, it passes through line 46 prior to entering a cooler 47 wherein the temperature is lowered to about 100° F. The cooled "polymer" passes from the cooler 47 to line 12, and thence, it enters the top of absorption section 10.

The overhead vaporous product from the lean oil stripper 39 passes through line 49, line 50, and thence it is cooled to a temperature of about 100° F. by means of condenser 52. The cooled overhead product is passed from condenser 52 to a separating drum 53 by means of line 54. Separating drum 53 is maintained at a temperature of about 100° F. and a pressure of about 40 p.s.i.g. The gasoline product is discharged from the bottom of drum 53 by means of line 56, and it is pumped by means of pump 57 through line 58. A portion of the gasoline product having an API gravity of about 54.6° in line 58 is recycled to the top of stripper 39 by means of line 60 at the rate of about 2625 barrels per day. The remaining portion of gasoline in line 58 is passed to line 61 at the rate of about 8156 barrels per day. The normally gaseous material in drum 53 is passed overhead therefrom by means of line 63, and thence, it is passed to a liquid trap-out drum 64 before being compressed to a pressure of about 240 p.s.i.g., by means of compressor 66. The gaseous material passes from trap-out drum 64 to compressor 66 by means of line 67. The compressed gaseous material having a molecular weight of about 26.5 is charged to the bottom of absorption section 7 by means of line 69 at the rate of about 841 pounds per hour.

The net yield of "polymer" from the bottom of stripper 39 is passed from line 42 to line 72, and thence, it enters the intermediate section of a polymer stripper 73, where the heavy gasoline components are separated from the true polymer which has an initial boiling point of about 400–420° F. In the polymer stripper, the top temperature is about 360° F. and the bottom temperature is about 455° F., while employing a pressure of about 8 p.s.i.g. It is to be noted that the pressure in the polymer stripper is lower than the pressure in the lean oil stripper, consequently, stripping action is enhanced by a reduction of pressure, as well as heating of the material to an elevated temperature in the presence of steam to prevent decomposition of the polymer product. The stripping of gasoline from the polymer is effected with high pressure stream introduced into the bottom of stripper 73 at the rate of about 760 pounds per hour. The overhead vaporous fraction is removed from the top of the tower by means of line 76 and is cooled to a temperature of about 120° F. means of condenser 77. The cooled overhead product is passed to a separating drum 78 by means of line 80. In separating drum 78, maintained at about 120° F., and atmospheric pressure, gaseous material is discharged from the top of the drum by means of a valved line 81. Water is discharged from the bottom thereof by means of a valve line 83 at the rate of 1.5 gallons per minute. The gasoline material which is stripped from the polymer is removed from drum 78 by means of line 85. This gasoline material is passed from line 85 to line 86 by means of pump 87. The gasoline in line 86 is divided such that a portion, namely about 154 barrels per day having an API gravity of about 31.4° is recycled to the top of the stripper 73 by means of line 88. The remaining gasoline passes through line 86 to line 90 at the rate of about 575 barrels per day. The net production of gasoline from the polymer stripper flows to line 50 wherein it is combined with the gasoline product which is produced in the lean oil stripper. A net production of polymer is recovered from the bottom of stripper 73 via line 92. This polymer is cooled to a temperature of about 100° F. by means of cooler 93 prior to being yielded from the system through line 94.

The net production of raw gasoline from the lean oil stripper passes through line 61 to a depropanizer 97. In the depropanizer 97, the top temperature is maintained at about 120° F., with the bottom temperature maintained at about 430° F., at a pressure of about 260 p.s.i.g. The vaporous overhead product from the depropanizer passes through line 98 and then it is cooled to a temperature of about 105° F. by means of condenser 99. The cooled overhead product is passed from condenser 99 to separating drum 101 by means of line 102. In the separating drum, the temperature is about 105° F. and the pressure is about 245 p.s.i.g. Normally gaseous material is discharged from separating drum 101 by means of line 104. The liquid in separating drum 101 is removed therefrom by means of line 105. This liquid is pumped from line 105 to line 106 by means of pump 107. A portion of the liquid is passed from line 106 to line 109 at the rate of about 530 barrels per day having a specific gravity of about 4.16 pounds per gallon. The remaining 3020 barrels per day of liquid is recycled to the top of depropanizer column 97 by passing from line 106 to line 110. The depropanized gasoline is yielded from the bottom of depropanizer 97 by means of line 114 and it is cooled to a temperature of about 100° F. by means of cooler 115. The cooled depropanized gasoline is discharged from the system by means of line 116.

In order to provide heat to columns 39, 73 and 97, a portion of the liquid in the bottom of the tower is withdrawn, heated, and recirculated thereto. Such reboiling means are not shown in the drawing.

Having thus provided a written description of our invention, it should be understood that no undue limitations or restriction are to be imposed by reason thereof, but that the scope of the present invention is defined by the appended claims.

We claim:
1. In a reforming process wherein a light hydrocarbon oil is passed in contact with a reforming catalyst under reforming conditions to produce a reformed effluent comprising gasoline, polymer and normally gaseous product, the improvement which comprises passing the total effluent of said reforming step directly to a first separation zone, in said first separation zone separating at an elevated pressure a gaseous fraction from a liquid fraction, passing the liquid fraction from the first separation zone to a second separation zone maintained at a lower pressure but at a higher temperature than said first separation zone to effect separation of a major portion of the reformed gasoline product from the polymer product without decomposition of the polymer product, recovering the major portion of the gasoline product from the upper portion of said second separation zone, recovering the polymer product containing a minor portion of the gasoline product from the bottom of the second separation zone, passing a portion of the recovered polymer product containing gasoline product to a third separation zone maintained at a lower pressure and temperature than said second separation zone, introducing sufficient steam to the lower portion of said third separation zone to reduce the partial pressure of the polymer and strip gasoline product therefrom without decomposing the polymer and recovering stripped gasoline product from the upper portion of said third separation zone for combining with the recovered gasoline product of said second separation zone.

2. In a reforming process wherein an effluent comprising gasoline, polymer and normally gaseous product is obtained, the improvement for separating the gasoline product from the polymer product which comprises, passing the total effluent comprising gasoline, polymer and gaseous material directly to a first high pressure separation step to separate gaseous material from liquid material, recovering liquid material from the first high pressure separation step, passing the recovered liquid material to a second separation step maintained at superatmospheric pressure but below the pressure employed in the first separation step for separation of the liquid material to recover a major portion of the reformed gasoline from the polymer material, said second separation step being effected at an elevated temperature but below the decomposition temperature of the polymer material at the pressure employed therein, recovering gasoline material containing polymer material concentrated therein from said second separation step, passing gasoline material with polymer material concentrated therein to a third separation step maintained at a pressure below about 10 p.s.i.g., wherein sufficient steam is admixed with said polymer material to improve stripping and reduce the partial pressure of the polymer to maintain its bubble point about 455° F., recovering stripped gasoline material from the upper portion of said third separation step and polymer concentrate from the bottom of said third separation step.

3. The process of claim 2 wherein the gasoline product in the first and second separation steps is combined and further treated to recover a depropanized gasoline product.

4. A method for separating the effluent of a hydroforming process comprising gasoline, polymer and normally gaseous product which comprises passing the effluent stream comprising gasoline, polymer and normally gaseous material obtained from a reforming zone after cooling to a temperature of about 100° F. directly to a first separation zone maintained at an elevated pressure, recovering a liquid stream from said first separation zone comprising gasoline and polymer, heating the liquid stream recovered from the first separation zone to an elevated temperature of about 400° F. and passing the thus heated liquid stream to a second separation zone maintained at a pressure not less than about 40 p.s.i.g., adding heat to the lower portion of said second separation zone to maintain a temperature below about 500° F. in the lower portion thereof, recovering a gasoline rich stream from the upper portion of said second separation zone and a gasoline stream containing polymer concentrated therein from the bottom thereof, passing a portion of the recovered gasoline stream containing polymer concentrated therein to a third separation zone maintained at a lower pressure than said second separation zone, introducing steam to the lower portion of said third separation zone sufficient to complete stripping of gasoline from said polymer concentrate and reduce the partial pressure of said polymer to maintain its bubble point about 455° F., and recovering polymer concentrate from the lower portion of said third separation zone.

5. A method for separating polymer product from a naphtha product obtained from a reforming process which comprises passing the effluent of a reforming process directly to a first separation step maintained at substantially the same pressure as the reforming process and a temperature below about 400° F., recovering liquid naphtha product containing polymer product from said first separation step and passing the same to a second separation step maintained at a lower pressure than said first separation step and a temperature in the range of from about 365° F. to about 500° F., recovering reformed naphtha product from the upper portion of the second separation zone and a minor naphtha product stream containing polymer product concentrated therein from the lower portion of said second separation zone, passing the naphtha stream containing polymer product concentrated therein from the second separation zone to a third separation zone maintained at a lower pressure than said second separation zone, introducing stripping material into the lower portion of said third separation zone maintained at a temperature in the range of from about 120° F. to about 455° F., and separately recovering from said third separation zone stripped naphtha product from the polymer concentrate.

References Cited in the file of this patent
UNITED STATES PATENTS

| | | |
|---|---|---|
| 2,600,133 | Simms | June 10, 1952 |
| 2,719,816 | Rich | Oct. 4, 1955 |
| 2,847,359 | Beuther et al. | Aug. 12, 1958 |
| 2,901,418 | Pappas | Aug. 25, 1959 |